United States Patent [19]

Langowski et al.

[11] Patent Number: 4,658,392
[45] Date of Patent: Apr. 14, 1987

[54] OPTICALLY READABLE, HIGH STORAGE DENSITY, INFORMATION CARRIER

[75] Inventors: Horst-Christian Langowski; Klaus Schmitz, both of Hanover, Fed. Rep. of Germany

[73] Assignee: Polygram GmbH, Hamburg, Fed. Rep. of Germany

[21] Appl. No.: 727,852

[22] Filed: Apr. 26, 1985

[30] Foreign Application Priority Data

Jul. 11, 1984 [DE] Fed. Rep. of Germany ....... 3425578

[51] Int. Cl.$^4$ .................. B32B 3/02; C23C 21/08; G11B 3/70
[52] U.S. Cl. .................... 369/288; 369/283; 369/286; 420/413; 420/534; 428/64; 428/65
[58] Field of Search .............. 369/286, 283, 288; 428/64, 65, 457; 420/469, 534, 413

[56] References Cited

U.S. PATENT DOCUMENTS

| | | | |
|---|---|---|---|
| 3,149,001 | 9/1964 | Wallace | 420/534 X |
| 3,162,552 | 12/1964 | Foerster | 420/413 |
| 4,057,831 | 11/1977 | Antonius et al. | 369/288 X |
| 4,077,051 | 2/1978 | Vossen, Jr. | 428/64 X |
| 4,077,052 | 2/1978 | Vossen, Jr. | 428/64 X |
| 4,113,472 | 9/1978 | Fister, Jr. et al. | 420/534 X |
| 4,313,190 | 1/1982 | Slaten | 369/286 X |
| 4,371,954 | 2/1983 | Cornet | 369/286 X |
| 4,450,553 | 5/1984 | Holster et al. | 369/286 X |

FOREIGN PATENT DOCUMENTS

| | | | |
|---|---|---|---|
| 0141501 | 5/1985 | European Pat. Off. | 420/534 |
| 58-147541 | 9/1983 | Japan | 420/534 |
| 57-149445 | 9/1983 | Japan | 420/534 |
| 60-92441 | 5/1985 | Japan | 420/534 |

*Primary Examiner*—Lorraine T. Kendell

[57] ABSTRACT

An optically readable, high storage density information carrier usually in the form of a disk, for example, a digitally recorded audio disk (CD) or a video disk (VLP) including a base, and a microstructure on the base which contains the recorded information, and consists of spiral or annular tracks or channels on one or both sides thereof. A reflective layer of a suitable metal or alloy is applied to the side of the information disk carrying the microstructure in at least that portion in which the microstructure exists. The present invention provides an improved reflective layer which, in turn, is covered by a protective layer. The improved reflective layer is a metal alloy selected from one of the following groups of alloys: (1) a Cu-Cr alloy containing from 0.3 to 1.5% chromium, (2) an Al-Mg-Si alloy containing 0.5 to 1.5% each of magnesium and silicon, and (3) an Mg-Mn-Si alloy containing 1.2 to 2% manganese and 0.05 to 0.1% silicon.

7 Claims, 3 Drawing Figures

OPTICALLY READABLE, HIGH STORAGE DENSITY, INFORMATION CARRIER

BACKGROUND OF THE INVENTION

1. Field of the Invention

The present invention is in the field of optically readable, high storage density information carriers such as digital audio disks (CD) or video disks (VLP) containing improved reflective layers of alloys on that side of the information disk which contains the microstructure housing the recorded information. The reflective layer is itself covered with a protective layer.

2. Description of the Prior Art

In one method for manufacturing a disk-shaped information carrier, a blank is first manufactured in a transfer molding process. The information structure side of the blank is subsequently provided with the desired reflective layer by means of a sputtering system. For the protection of the side carrying the information structure as well as for the protection of the reflective layer applied thereto, another protective layer in the form of a protective lacquer is then applied over the reflective layer. The reflective layer must meet stringent demands with respect to faultless adhesion, adequately high reflecting properties for the laser beam reading the information, as well as retaining these properties over extended periods of time.

European Published Applications Nos. 0,064,777 Al and 0,086,009 Al have suggested the employment of metal alloys which allegedly meet the required properties for the production of the reflective layer instead of using pure metals such as silver or aluminum. Application No. 0,064,777 Al describes the use of Ag-Cu alloys with more than 40 atomic % Ag, Cu-Cr alloys with more than 8 atomic % Cr, an Al-Cr alloy with more than 75 atomic % Al, an Al-Cu alloy with more than 40 atomic % Al, an Al-B alloy with more than 70 atomic % Al, an Al-Mn alloy with at least 75 atomic % Al, and an Al-lanthanide alloy containing from 0.1 to 3 atomic % of the lanthanide.

Published Application No. 0,086,009 suggests using reflective surfaces composed of a nitride, carbide or boride of a transition metal from the group consisting of titanium, zirconium, hafnium, vanadium, niobium, molybdenum, lanthanum, tantalum, and tungsten.

SUMMARY OF THE INVENTION

The present invention provides further metal alloys for the manufacture of a reflective layer in an optically readable information storage disk which provides good adhesion, highly reflective properties, and long-term stability. The alloys do not require high purity of the metal constituents and are therefore especially suitable for a reduced cost mass production.

The optically readable information storage disk of the present invention whether of the audio or video type includes a reflective layer of at least one metal alloy from one of the following groups of metal alloys:

(1) A Cu-Cr alloy containing from 0.3 to 1.5% chromium, balance essentially Cu, (2) An Al-Mg-Si alloy containing 0.5 to 1.5% each of magnesium and silicon, balance essentially Al, and (3) An Mg-Mn-Si alloy containing 1.2 to 2% manganese and 0.05 to 0.1% silicon, balance essentially Mg, all of the percentages given being by weight.

The metal alloys specified herein have proven to be extremely stable and corrosion resistant in their application as reflective layers and also do not require the use of ultra-pure metals with respect to the metal constituents employed. Furthermore, these metal alloys have also proven exceptionally suited for employment in sputtering systems since they produce a good yield and therefore permit optically dense layers to be generated with a low layer thickness. Particularly advantageous in this respect is the Mg-Mn-Si alloy containing 1.2 to 2% manganese and 0.05 to 0.1% silicon which permits a particularly high yield, i.e., the relative number of sputtered magnesium atoms per argon ions impinging the cathode. The sputtering times otherwise required can consequently be substantially reduced as a result thereof, using the same power density.

BRIEF DESCRIPTION OF THE DRAWINGS

In order to illustrate the reflective layers of the present invention being applied to optically readable, disk-shaped information carriers, various embodiments of such information storage disks are shown in the drawings in which.

DESCRIPTION OF THE PREFERRED EMBODIMENTS

Figure 1:
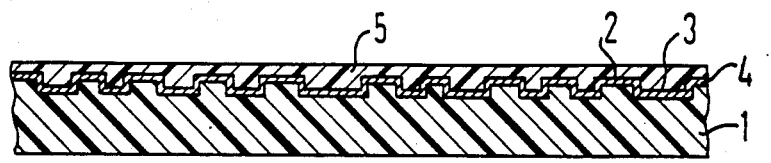
FIG. 1 is an enlarged cross-sectional view of an optically readable, disk-shaped information carrier according to the present invention.

Referring to the drawings, the disk-shaped information carrier of FIG. 1 is composed of a base plate 1 made of a synthetic resin such as a thermoplastic or duroplastic (pressure settable) material. The recorded information is in the form of alternating elevations 2 and depressions 3 impressed on one side of the disk, namely, on the upper side. This information microstructure is provided with a reflective layer 4 which is formed from one of the metal alloys mentioned previously and is preferably applied by sputtering such that a thin, optically dense layer is produced. The reflective layer itself is, in turn, covered with a protective lacquer layer 5.

Figure 2:
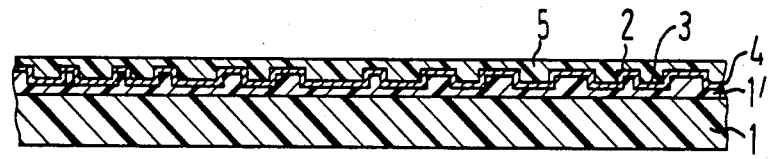
FIG. 2 is an enlarged cross-sectional view of a modified form of optically readable, disk-shaped information carrier.

In the modified structure shown in FIG. 2, the base plate 1 is bonded at its surface to a thin substrate plate 1' in which the information structure is contained, consisting of elevations 2 and depressions 3. This microstructure is covered by a metallic reflecting layer 4 of the type previously described, and a protective lacquer layer 5 is disposed thereabove. This form of the invention, instead of using a transfer molding process of the base plate with the information structure, may provide the substrate 1' initially in a mold which is filled with a hardenable synthetic lacquer which produces the substrate 1' after it has hardened. Alternatively, the substrate 1' can already be bonded to the base plate 1 when it is manufactured.

Figure 3:
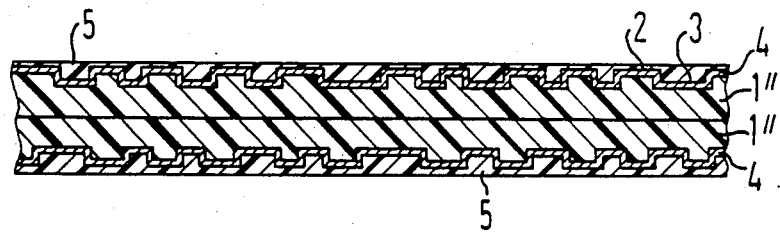
FIG. 3 is an enlarged cross-sectional view of a further modified optically readable, disk-shaped information carrier of laminated construction in accordance with the present invention.

The optically readable, disk-shaped information carrier of FIG. 3 comprises an information structure on both sides and is formed of a laminate between two disk-shaped information carriers of the type shown in FIG. 1. These carriers are bonded to one another at their undersides. The sub-base-plates are referenced 1'' in FIG. 3.

Of course, it is also possible to manufacture a disk-shaped information carrier comprising an information microstructure on both sides in such fashion that the information structure is impressed into the disk surface on both sides during the transfer molding of the disk blank. In this case, the information carrier is then provided with a reflective layer disposed thereabove on both sides.

The present invention provides a particularly effective high storage density, disk-shaped information carrier that comprises a suitable reflective layer for optical read-out by a laser beam by reflection on the side of the information microstructure and is suitable for all kinds of information to be stored, particularly for video, audio, and data information. Such information carriers enjoy widespread use for arbitrary playback of the storage content in playback devices of the entertainment industry and in commercial data banks.

It will be evident that various modifications can be made to the described embodiments without departing from the scope of the present invention.

We claim as our invention:

1. In an optically readable, high storage density information carrier comprising a base, a microstructure in which tracks of varying depth contain recoverable information located on at least one side of said base, a reflective layer on the surface or surfaces of said base which has said microstructure formed on it, and a protective layer covering said reflective layer, the improvement which comprises:
    utilizing as said reflective layer at least one of the following classes of metal alloys:
    (1) an Al-Mg-Si alloy containing from 0.5 to 1.5% each of magnesium and silicon, and
    (2) an Mg-Mn-Si alloy containing from 1.2 to 2% manganese and 0.05 to 0.1% silicon.

2. An information carrier according to claim 1 wherein said base is composed of a thermoplastic resin.

3. An information carrier according to claim 1 wherein said base is composed of a duroplastic resin.

4. An information carrier according to claim 1 in the form of a disk.

5. An information carrier according to claim 4 wherein said disk is a digitally recorded audio disk.

6. An information carrier according to claim 4 wherein said disk is a video recorded disk.

7. An information carrier according to claim 1 wherein said reflective layer is the Mg-Mn-Si alloy containing from 1.2 to 2% manganese and 0.05 to 0.1% silicon.

* * * * *